Jan. 17, 1961     R. L. LICH     2,968,259
FOUR WHEEL TRUCK

Filed Dec. 10, 1956     2 Sheets-Sheet 1

INVENTOR
RICHARD L. LICH
BY Rodney Bedell
ATTORNEY

INVENTOR
RICHARD L. LICH
BY Rodney Bedell
ATTORNEY

United States Patent Office

2,968,259
Patented Jan. 17, 1961

---

2,968,259

FOUR WHEEL TRUCK

Richard L. Lich, St. Louis, Mo., assignor to General Steel Castings Corporation, Granite City, Ill., a corporation of Delaware Filed Dec. 10, 1956, Ser. No. 627,411

3 Claims. (Cl. 105—190)

The invention relates to railway rolling stock and more particularly to truck structure in which the truck side frames are spring-supported on the axle journal boxes and a lateral motion load-supporting bolster is mounted on the side frames.

The main object of the invention is to mount the bolster on the side frames so that the side frames may tilt lengthwise of the truck relative to the bolster and the vehicle body carried thereby and to each other.

Other ancillary objects are to afford adequate spring support for the truck load and adequate stability of the truck frame and bolster assembly transversely of the truck.

In the accompanying drawings illustrating a selected embodiment of the invention:

Figure 1:
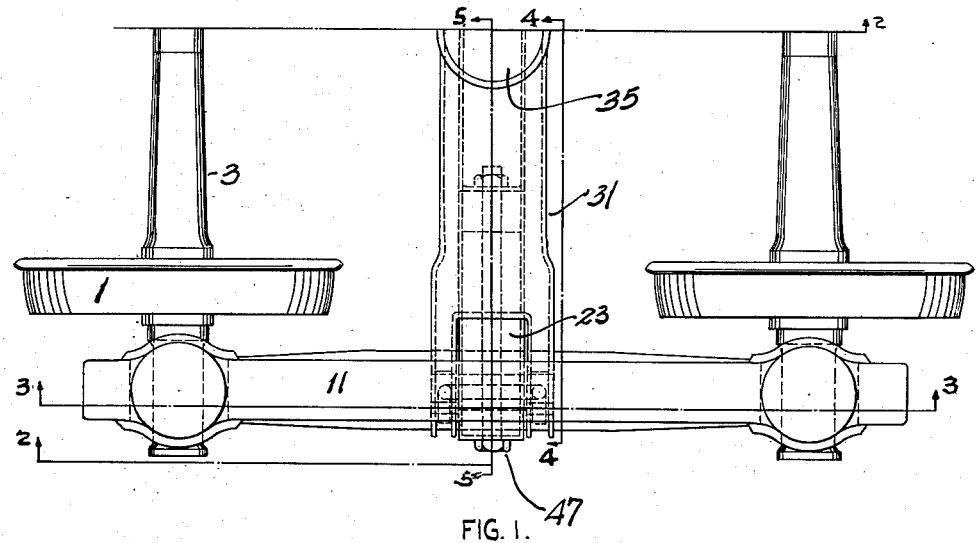
Figure 1 is a top view of one longitudinal half of a four-wheel truck.
Figure 2:
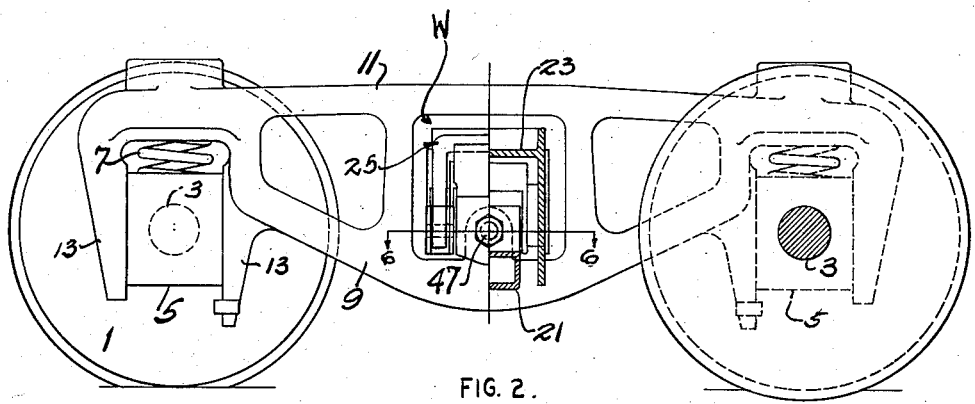
Figure 2 is in part a side elevation and in part a longitudinal vertical section on line 2—2 of Figure 1.
Figure 3:
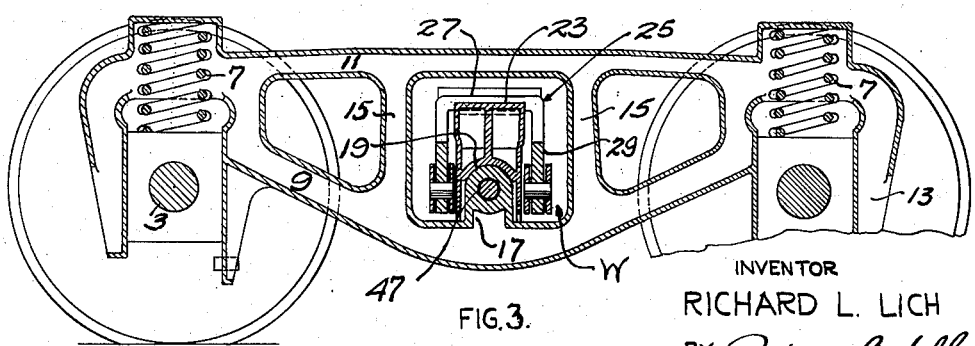
Figure 3 is a longitudinal vertical section on the line 3—3 of Figure 1.
Figure 4:
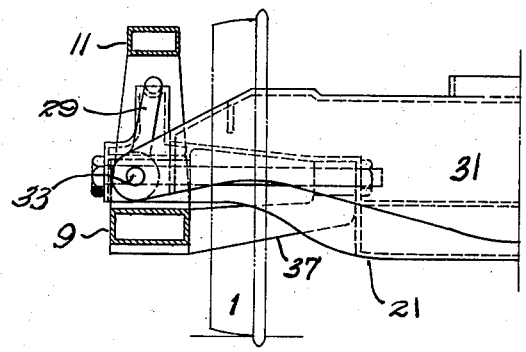
Figure 4 is a transverse vertical section on line 4—4 of Figure 1.
Figure 5:
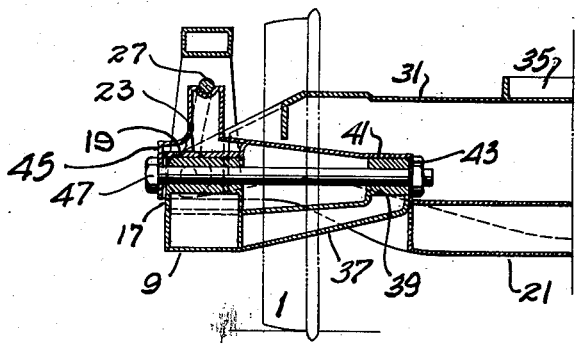
Figure 5 is a transverse vertical section on the line 5—5 of Figure 1.
Figure 6:
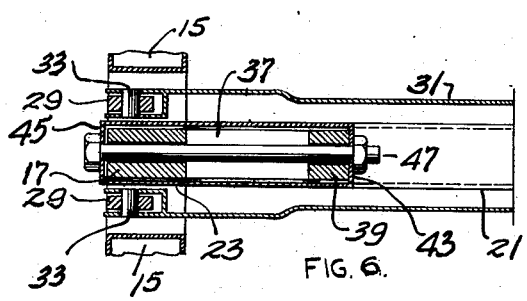
Figure 6 is a horizontal section on the line 6—6 of Figure 2.

The truck comprises the usual wheels 1, axles 3, journal boxes 5, truck springs 7, and truck side frames having lower members 9, upper members 11, end pedestal jaws 13, and spaced uprights 15 forming a rectangular window W intermediate the ends of the frame.

An upward projection 17 between the upright sides of each window has an arcuate upper surface 19 forming a pivot element with its axis extending transversely of the truck.

A separately formed transom 21 of box section extends transversely of the truck and its end portions 23 straddle and seat upon pivot element 19. An inverted U-shaped hanger 25 at each side of the truck has a cross bar 27 journaled in the upper portion of the transom end portion 23 in the same general vertical plane as the side frame and the center of the pivot surface 19 and has depending legs 29 straddling the transom and pivot element. A bolster 31 extends transversely of the truck with its end portions bifurcated and straddling the adjacent portions of transom 21 and having pivot pin connections 33 to the lower ends of swing hanger legs 29. The intermediate portion of the bolster has a load-carrying center plate 35. The relation between the swing hanger cross bar 27, and bolster supporting pins 33 and the centers of pivot surfaces 19 produce a straight vertical transmission of load from side frames to bolster and avoids utilizing transom 21 as a beam to transfer a load between horizontally spaced supported and supporting points. The transom may be lightened accordingly.

With this structure each side frame may tilt about the axis of its pivot element relative to the transom and the bolster and the other side frame and hence the springs 7 supporting each side frame may compress or expand freely to accommodate rail inequalities and without setting up heavy torsional stresses as in the usual truck frame transverse members or in the bolster or in the hangers mounting the bolster on the truck frame structure. By suspending the hangers from the transom and pivoting the transom on the side frames, lateral motion of the trucks and equalization of the load on the springs is facilitated.

In other words, differential action of the truck springs is not resisted by the rigidity of the truck frame and bolster assembly. Also, the cross bars of the swing hangers remain horizontal irrespective of the inclination of the truck side frames due to spring action or due to the inclination of the trucks at opposite ends of the vehicle relative to each other as they pass over relatively low or elevated track sections.

Preferably the stability of the transom and side frame assembly is increased by the provision of lateral bracket 37 extending inboard from each side frame lower member 9 in the same general vertical plane as pivot element 19 and terminating at its inner end in an upstanding pivot element 39 having its upper face at the same height as pivot element 19. The transom is shaped to have a bearing 41 on each pivot element 39. The transom has upright webs 43 and 45 opposing corresponding upright faces on the pivot elements and thereby holds the side frames in spaced relation transversely of the truck. Bolts 47 maintain the side frame and transom assembly but do not interfere with the pivoting of the transom on the side frames.

The details of the structure may be varied substantially without departing from the spirit of the invention and the exclusive use of those modifications coming within the scope of the claims is contemplated.

What is claimed is:

1. A railway truck having spaced wheeled axles, rigid side frames extending between and spring supported on said axles outboard of the wheels, each comprising an upper member and a lower member and a pair of uprights between said members forming a window intermediate the ends of the frame, there being a narrow pivot element projecting upwardly from the bottom of the window intermediate its sides with its axis extending transversely of the truck, a transverse transom extending between the side frames and through said window and seated directly on said pivot elements to tilt thereon lengthwise of the truck, inverted U-shaped hangers straddling the end portions of the transom in said windows, each having a cross bar extending transversely of and journaled on the upper portion of the transom and having legs at the sides of the transom and depending fore and aft of the corresponding pivot element, a bolster of inverted U-shaped cross section straddling the transom and having a load-carrying center plate intermediate its ends and having its end portions pivotally connected to the lower ends of the swing hanger legs fore and aft of the transom to provide movement of the bolster transversely of the truck relative to the side frames.

2. A railway truck having spaced wheeled axles and rigid side frames extending between and mounted on said axles and tiltable vertically relative to each other, each side frame comprising an upper member and a lower member and a pair of uprights between said members forming a window intermediate the ends of the frame, there being a narrow pivot element projecting upwardly from the lower member at the bottom of each window intermediate said uprights with its axis extending transversely of the truck, a separate transverse transom extending between the side frames and through said windows with downwardly facing recessed bearings seated directly on said pivot elements to tilt thereon lengthwise of the truck, swing hangers suspended at their upper ends from the transom fore and aft of each pivot element, a rigid bolster of inverted U-shaped cross section straddling the transom and having a load carrying center plate intermediate its ends and having its end portions pivotally connected at their lower ends directly to the lower ends of the swing hangers to provide movement of the bolster transversely of the truck relative to the transom and side frames.

3. A railway truck having spaced wheeled axles, rigid side frames outboard of the wheels and extending between and carried on said axles, each side frame having a bracket intermediate its ends projecting from the lower portion of the side frame inboard of the wheels, there being upstanding pivot elements on each side frame and on the inner end of its bracket, the axes of all said pivot elements extending transversely of the truck, a transom member extending between and spacing the side frames and having downward projections mounted directly on said pivot elements, swing hangers suspended from each end portion of the transom in the general plane of the side frame, fore and aft of said pivot elements, a load carrying bolster having a rigid downwardly opening bifurcation at each end straddling the corresponding pivot element and the transom and pivotally connected directly to the lower ends of said hangers at the level of said axis, whereby the hangers provide for movement of the bolster transversely of the side frames by the swinging of said hangers, and the pivot elements provide for the tilting of the side frames lengthwise of the truck relative to the bolster and transom and to each other about an axis substantially the same level as the hanger connections to the bolster.

References Cited in the file of this patent

UNITED STATES PATENTS

| | | |
|---|---|---|
| 1,189,717 | Meyer | July 4, 1916 |
| 2,212,989 | Levy | Aug. 27, 1940 |
| 2,368,784 | Schrage | Feb. 6, 1945 |
| 2,756,691 | Masel et al. | July 31, 1956 |
| 2,777,402 | Rossell | Jan. 15, 1957 |
| 2,840,009 | Dilworth | June 24, 1958 |

FOREIGN PATENTS

| | | |
|---|---|---|
| 952,354 | Germany | Nov. 15, 1956 |
| 168,323 | Switzerland | June 16, 1934 |